United States Patent

[11] 3,569,809

| [72] | Inventor | Donald T. Comer<br>Los Angeles, Calif. |
|---|---|---|
| [21] | Appl. No. | 703,219 |
| [22] | Filed | Jan. 22, 1968 |
| [45] | Patented | Mar. 9, 1971 |
| [73] | Assignee | Mobility Systems, Inc.<br>San Jose, Calif. |

[54] DC ELECTRIC MOTOR CONTROL SYSTEMS
20 Claims, 6 Drawing Figs.

[52] U.S. Cl. .................................................. 318/338,
318/350
[51] Int. Cl. .................................................. H02p 5/06
[50] Field of Search ........................................ 318/317,
432, 310, 311, 350; 318/338, 355

[56] References Cited
UNITED STATES PATENTS
| 3,217,223 | 11/1965 | Chubb, Jr. .................... | 318/338 |
| 3,435,316 | 3/1969 | Wilkerson ..................... | 318/338 |
| 3,458,790 | 7/1969 | Wilkerson ..................... | 318/338 |
| 3,458,791 | 7/1969 | Boice ........................... | 318/355 |
| 3,023,351 | 2/1962 | McLane et al. ................ | 318/338 |

Primary Examiner—Oris L. Rader
Assistant Examiner—Thomas Langer
Attorney—Richard G. Stephens ABSTRACT: A variable-speed direct current shunt motor control system having an increased torque at its upper speed range, in which motor speed is controlled by controlling voltage applied to the motor armature and in which field voltage is derived by summing a first voltage commensurate with the applied armature voltage and a feedback voltage commensurate with motor speed. A time-lag circuit delays application of the feedback voltage during acceleration from a low speed. A closed loop speed control system includes a regenerative braking circuit which charges an energy buffer during deceleration to reclaim energy expended during acceleration.

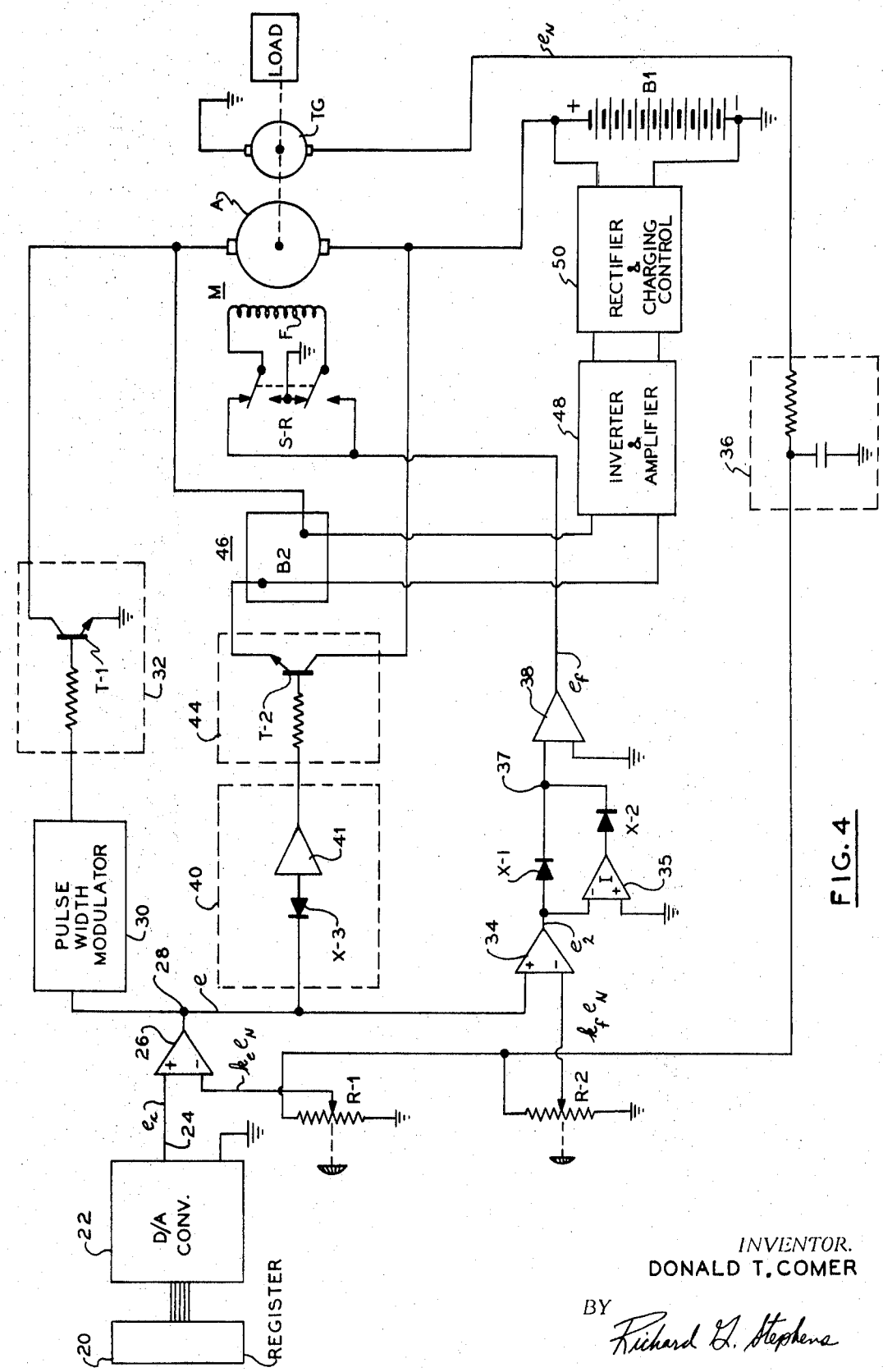

PATENTED MAR 9 1971

*INVENTOR.*
DONALD T. COMER

BY *Richard D. Stephens*

ATTORNEY

DC ELECTRIC MOTOR CONTROL SYSTEMS

A variety of electric motor control applications, and particularly automatic control applications, require that a motor be controlled with rapid acceleration and precise speed control over a wide range of speeds. While ordinary series motors develop very high torques at very low speeds and hence provide superior acceleration at low speeds, their torque-speed characteristic for a given applied voltage decreases greatly with speed, in a hyperboliclike fashion, so that series motors are capable of producing only very small torques over much of their upper speed range. Shunt motors, while capable of less torque at low speeds, often are preferred to series motors, as the speed-torque characteristic of ordinary shunt motors at a given applied voltage decreases substantially linearly with speed. However, the torque of an ordinary shunt motor also becomes very low at high speeds, and becomes zero at a maximum speed. The very small torques which ordinary series and shunt motor systems provide at high speeds disadvantageously affect the operation of a number of systems in which such motors are utilized, including a number of automatic control applications. One object of the present invention is to provide an improved motor control system having a torque-speed characteristic which tends to be more constant or more flat over a wider range of speeds than those of either the series motor or the shunt motor. In accordance with one aspect of the present invention, a voltage commensurate with the speed of a shunt motor is subtracted from the applied field voltage to provide an improved acceleration characteristic wherein the torque developed in only slightly less than that developed by an ordinary shunt motor at low speeds, and considerably greater than that developed by an ordinary shunt motor at high speeds. Thus it is one specific object of the invention to provide a motor control system having an improved torque-speed characteristic.

A number of applications involve frequent acceleration from stand-still or a low speed as rapidly as possible to a desired high speed. In accordance with the invention, subtraction of the speed voltage to improve the torque-speed characteristic may be delayed in time, so that a motor will initially accelerate with the slightly superior torque-speed characteristic of an ordinary shunt motor, but eventually attain the above-mentioned improved torque-speed characteristic as the upper speed range of the motor is reached.

Another object of the present invention is to provide an improved motor control system of the type mentioned in which control of the torque-speed characteristic is effected by control of motor field current rather than armature current, so that devices having low-current carrying capacities, such as many solid-state control devices, e.g., transistors, may be economically employed.

A further object of the present invention is to provide an improved motor control system of the type mentioned in which dynamic or regenerative braking may be utilized.

Still a further object of the invention is to provide a motor control system capable of providing higher speeds for a given armature voltage.

The invention finds particular utility in certain computer-controlled battery-powered material-handling systems, such as the control of traction motors and hoist motors on lift trucks and like devices used in automatic warehousing operations where frequent stopping and starting, rapid accelerations to desired speeds, and close speed control over very wide speed ranges are necessary. One form of the present invention involves a closed-loop motor speed control system having both acceleration and deceleration control, and means for reclaiming during deceleration a portion of the battery energy expended during acceleration. Thus further objects of the invention are to provide an improved computer-controlled battery-powered motor speed control system having improved speed control and greater efficiency.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 4 is an electrical schematic of one form of computer-controlled motor speed control system constructed in accordance with the invention.

Figure 1:
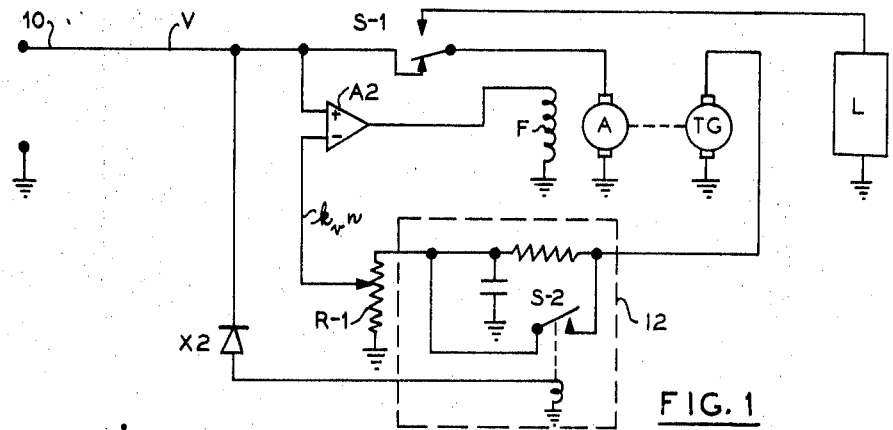
FIG. 1 is an electrical schematic diagram of one form of shunt motor control system constructed in accordance with present invention.

In all ordinary direct-current motors of usual types the following expression govern motor torque T: $T = K_H \Phi I_a$  (1) where $\Phi$ equals field flux, $I_a$ equals armature current, and $K_H$ is a motor constant relating units of torque, such as foot-pounds, to the product of flux and current. A common expression summing the voltages in the armature circuit is: $V = I_a r_a - kn\Phi$  (2) where $V$ is the applied voltage, and $kn\Phi$ expresses the back-e.m.f., where $n$ is the motor speed and $k$ is a further constant. Expression (2) may be rearranged to provide $$Ia = \frac{\wedge V - kn\phi}{r_a} \quad (3)$$

and substituted into equation (1) to provide:

$$T = \frac{K_H V \phi}{\wedge r_a} - \frac{K_H k n \phi^2}{r_a} \quad (3a)$$

$$T = \frac{K_H V V_f k_f}{\wedge r_a r_f} - \frac{K_H k\ k_f^2 V_f^2}{r_a r_f^2} n \quad (3b)$$

where $V_f$ and $r_f$ are the field voltage and field resistance, respectively, and where $k_f$ is a constant relating field current and field flux.

Designating the maximum torque (which occurs at zero speed in an ordinary shunt motor) as $T_o$, and designating the maximum speed (which provides zero torque in an ordinary shunt motor) as $n_o$, then $$T_o = \frac{K_H k_f V V_f}{r_a r_f} \quad (3c)$$

and $$n_o = \frac{V}{\wedge V_f} \cdot \frac{r_f}{k k_f} \quad (3d)$$

and $$T = T_o \left(1 - \frac{n}{n_o}\right) \quad (4)$$

Figure 2:
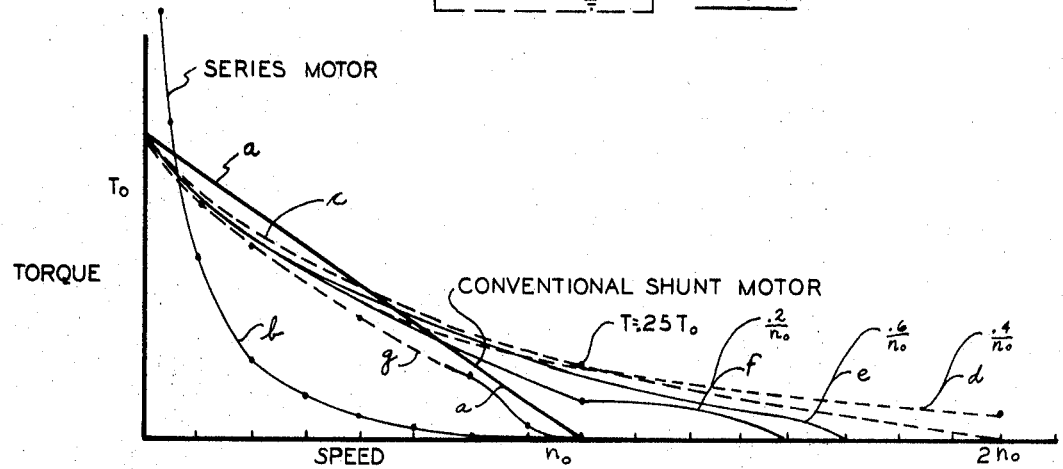
FIG. 2 is a graph showing the torque-speed characteristics of a series motor, an ordinary shunt motor, and a motor controlled in accordance with the present invention.

Plotting expression (4) as shown by curve $a$ in FIG. 2 provides the well-known straight-line torque-speed characteristic of an ordinary shunt motor. At the maximum possible speed $n_o$ of the shunt motor, the IR drop ($I_a r_a$) across the armature circuit equals the counter-electromotive voltage generated in the armature circuit. Utilizing the same basic DC motor expression (1) and (2) it is easy to demonstrate that the torque-speed characteristic of an ordinary series motor takes the form:

$$T = \frac{V}{a + bn + cn^3} \quad (4a)$$

which, when plotted as shown at curve $b$ in FIG. 2, provides the well-known hyperboliclike characteristic shown. The torques of both ordinary shunt and series motors will be seen from curves $a$ and $b$ to decrease to very low values over much of the upper speed ranges of such motors.

In the simplified embodiment of the invention illustrated in FIG. 1, the speed of motor M is controlled by control of the DC input voltage $V$ applied between terminal 10 and ground. Voltage $V$ may be derived in a variety of different ways in different applications, either manually or automatically. Voltages $V$ is shown applied directly across armature A, and as one input signal to a summing device shown as comprising a noninverting direct-coupled differential amplifier A2. Armature A of motor M is mechanically connected to drive a conventional tachometer generator TG which derives an output voltage commensurate with the speed of motor M. The tachometer generator output voltage is applied through time-lag circuit 12 and potentiometer R–1 to the opposite input line of differential amplifier A2 to oppose the voltage applied to amplifier A2 from terminal 10. It will be seen that the flux developed by field winding F during a steady-state condition will be proportional to:

$$\phi = \frac{k_f(V - nk_v)}{r_f} = \frac{Vk_f}{r_f} - \frac{nk_v k_f}{r_f} \quad (5)$$

where $k_v$ is a constant relating motor speed to the amount by which it decreases the voltage applied to field winding F. The constant $k_v$ will be seen to depend upon the volts per r.p.m. constant of tachometer generator TG, the drop across lag circuit 12, and the adjustment of potentiometer R–1.

From the general equation (3) and expression (5) the armature current of motor M of FIG. 1 may be written as:

$$I_a = \frac{V - kn\phi}{r_a} = \frac{V}{r_a} - \frac{knV_f k_f}{r_a r_f} + \frac{kn^2 k_f k_v}{r_a r_f} \quad (6)$$

From expression (6) and basic equation (1) —

$$T = \frac{K_H V k_f v_f}{r_a r_f} - \left(\frac{K_H k_f k_v V}{r_a r_f} + \frac{K_H k k_f^2 V_f^2}{r_a r_f^2}\right) n + \left(\frac{2K_H k k_f^2 k_v v_f}{r_a r_f^2}\right) n^2 - \left(\frac{K_H k k_f^2 k_v^2}{r_a r_f^2}\right) n^3 \quad (7)$$

Re-writing expression (7) in terms of $T_o$ and $n_o$ in the same manner as done above in connection with expression (4):

$$T = T_o\left[1 - n\left(\frac{1}{n_o} + \frac{k_v}{V_f}\right) + \left(\frac{2k_v}{n_o v_f}\right)n^2 - \left(\frac{k_v^2}{n_o v_f^2}\right)n^3\right] \quad (8)$$

While the torque of the ordinary shunt motor at speed $n_o$ is zero, as seen from expression (4), it will be seen from expression (8) that the torque of motor M of FIG. 1 at speed $n_o$ will be:

$$T_{n_o} = T_o\left[\frac{n_o k_v}{v_f} - \frac{n_o^2 k_v^2}{v_f^2}\right] = \frac{T_o n_o k_v}{V_f}\left(1 - \frac{n_o k_v}{V_f}\right) \quad (9)$$

Differentiating expression (9) and setting the differential $$\frac{dT_{n_o}}{dn_o}$$

equal to zero to maximize the torque at speed $n_o$, it will be seen that maximum torque at speed $n_o$, will result if:

$$\frac{k_v}{V_f} = \frac{0.5}{n_o} \quad (10)$$

The torque $T_{n_o}$ at speed $n_o$ then will equal $0.25\ T_o$, or one-fourth of the maximum torque, and the new speed $n_{T_o}$ at which torque becomes zero will be seen to be $2n_o$. A plot of expression (9) using the relationship of expression (10) is shown in dashed lines at $c$ in FIG. 2, and it will be immediately apparent from the dashed curve that the usable speed range has been considerably widened, with the torque being only slightly lessened at low speeds and being markedly improved at intermediate and high speeds. From expression (10) it may be seen that the field excitation at speed $n_o$ will be one-half of that which an ordinary shunt motor would have at speed $n_o$, the maximum speed of the ordinary shunt motor.

While the relationship between the constant voltage applied to the field and the opposing tachometer-derived voltage was selected in accordance with expression (10) in the above example in order to maximize torque at speed $n_o$, it is not necessary to use the precise relationship of expression (10) in practicing the invention. The tachometer sensitivity factor $k_v$ may be established (by adjustment of potentiometer R–1) at a value somewhat less than $0.5V_f/n_o$, thereby obtaining less flattening of the torque-speed characteristic, of course. If potentiometer R–1 were adjusted all the way down to ground in FIG. 1 it will be seen that the motor will operate as a conventional shunt motor. In FIG. 2 curve $d$ illustrates the torque-speed characteristic with the ratio $k_v/k_f$ established at $.4/n_o$, curve $e$ with the ratio established at $.6/n_o$, curve $f$ with the ratio established at $0.2/n_o$, and curve $g$ with the ratio established at $1.0/n_{oa8}$.

By substituting $2n_o$ for $n$ in expression (8), the torque at speed $2n_o$ may be written as $$T_{2n_o} = T_o\left[-1 + \frac{6n_o k_v}{v_f} - \frac{8n_o^2 k_v^2}{V_f^2}\right] \quad (11)$$

Setting the derivative $dT_{2no}/dn_o$ of expression (11) equal to zero, one finds that the torque will be maximized at speed $2n_o$ if the ratio $kv/v_f$ is set equal to $0.375/n_o$. It may be calculated from expression (8) that a ratio $k_v/k_f$ established at $1.0/n_o$ will provide zero torque at speed $n_o$, just as an ordinary shunt motor does, and hence in usual practice of the invention the ratio will be established at some value between approximately $0.2/n_o 1.0/n_o$, and will not exceed $1.0/n_o$. It will be seen from the above examples that different values for the ratio $k_v/V$ provide different flattening of the motor speed-torque curve at different speed ranges, and the selection of a particular value for the ratio will depend in any application upon the torque values desired at particular speed ranges.

Figure 3:
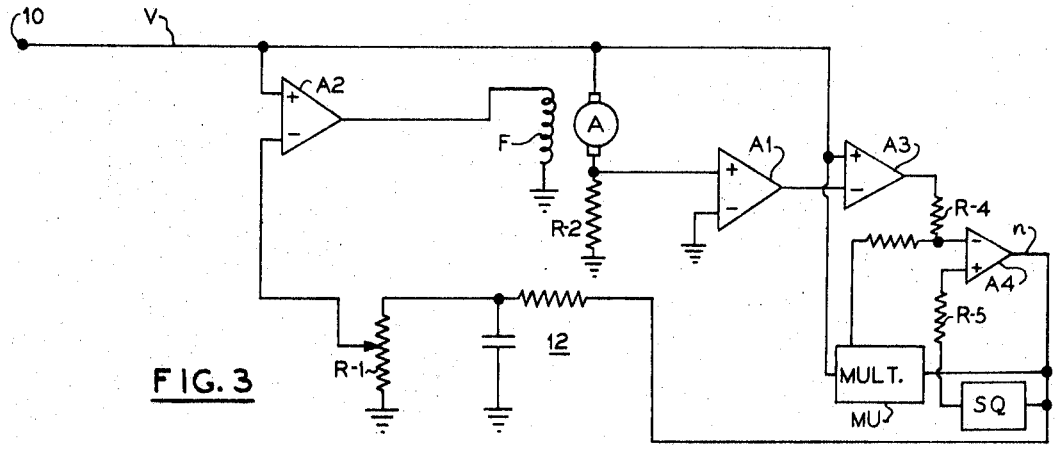
FIG. 3 is a simplified electrical schematic diagram of an alternative form of the invention in which a feedback voltage commensurate with motor speed is derived from the motor counter-electromotive force voltage instead of by use of a tachometer generator.

FIG. 3 illustrates an alternative form of the invention in which the feedback voltage is generated without the use of a tachometer generator. Resistor R–2 connected in series with armature A provides a voltage commensurate with $I_a R_a$, where the resistance $R_2$ of resistor R–2 equals $R_a/k$, and amplifier A1 is provided with gain $k$, so that the output voltage from amplifier A1 equals $I_a R_a$. The applied voltage $V$ and the output voltage from amplifier A1 are oppositely applied to amplifier A3, thereby deriving an output voltage commensurate with $V - I_a R_a$. In an ordinary shunt motor where field excitation varies directly with applied voltage, the quantity $V - I_a r_a$, which equals the back-e.m.f. of the motor $kn\Phi$, may be used as a measure of motor speed. In systems according to the invention, however, field excitation $\Phi$ varies with motor speed as well as with the applied voltage, and as shown above in connection with expression (5), field excitation is proportional to:

$$\phi = \frac{k_f(V - nk_v)}{r_f}$$

and the back-e.m.f. $c$ will be seen to equal:

$$c = \frac{knk_f(V - nk_n)}{r_f} \text{ or } \frac{kk_f nV}{r_f} - \frac{kk_f k_v n^2}{r_f}$$

In FIG. 3 an output voltage commensurate with speed $n$ is provided from amplifier A4, which receives an input voltage commensurate with $(V - I_a r_a)$ from amplifier A3 via resistor R–4, an input commensurate with $$\frac{kk_f nV}{r_f}$$

from a simple single-quadrant diode-type multiplier MU, and an input commensurate with $$\frac{kk_f k_v n^2}{r_f}$$

from a simple diode-type squaring circuit SQ via resistor R–5. Multiplier MU receives the applied input voltage $V$ and the speed $n$ output voltage from amplifier A4. The speed voltage from amplifier A4 also is applied to amplifier A2 via time-lag circuit 12 and sensitivity-adjusting potentiometer R-1 in the same manner in which the tachometer generator voltage is shown applied in FIG. 1.

The above discussion of the operation of the invention is not completely rigorous in that it neglects the effects of armature reaction. As in the case of ordinary shunt motors, the reaction of the armature flux with the field flux at low-speed high armature current conditions causes some decrease in torque at low speeds. However, the major improvement provided by the present invention is the increase in torque throughout the higher speed ranges, where armature reaction effects are small.

While the preceding discussion has been limited to the provision of an improved torque-speed characteristic during acceleration of a motor, it is important to note that the increased torque at higher speeds which the invention provides is also important in a variety of decelerating circuits, such as dynamic braking circuits, for example. In FIG. 1 switch S-1 is intended to represent a portion of a typical dynamic braking circuit, which when operated, removes the applied voltage from armature A and connects the armature across a resistive load $L$.

A variety of applications require that a motor frequently accelerate very rapidly from standstill or a very low speed up to a desired high speed. In FIG. 1 time-lag circuit 12, which is shown as comprising a simple first-order RC lag, will be seen to delay the application of the tachometer feedback voltage to amplifier A2 during acceleration, during which time diode X-2 will be reverse-biased and relay switch S-2 will be open. During deceleration, however, the current through diode X-2 will operate to close switch S-2, thereby shorting out time-lag circuit 12. If diode X-2 and switch S-2 are omitted, the velocity feedback signal will be delayed, of course, during both acceleration and deceleration. The electromechanical switch S-2 may be replaced by an electronic switch, of course. If a large voltage $V$, indicative of a desired maximum acceleration, is applied to line 10, it will be appreciated that the motor will accelerate from standstill initially in the manner of an ordinary shunt motor, and then gradually attain the improved torque-speed characteristic of the invention as lag circuit 12 charges up. In typical applications the time-constant of lag circuit 12 may be approximately one-third the time required for the motor to accelerate from standstill to a desired high speed. Upon receipt of a large input command voltage, field amplifier A2 immediately provides sufficient drive to field winding $F$ to magnetically saturate the field winding, thereby allowing the motor initially to accelerate with the benefit of the low-speed torque characteristic, but as the motor gains speed and time-lag circuit 12 charges up, the excitation will be reduced below the saturation level.

The invention as thus far described will be seen to have a variety of applications. It will be apparent that the voltage $V$ applied on terminal 10 to control the speed of motor M may be derived either manually, such as by adjustment of a rheostat or a switch, for example, or may be derived automatically in response to any one of a large number of conditions. In the form of the invention illustrated in FIG. 4 the voltage applied to the motor comprises the error voltage of a computer-controlled closed-loop speed control system.

In FIG. 4 a digital register means 20 is provided to receive and store a digital signal from a digital computer or other digital data-processing device (not shown). In a typical warehousing application register 20 may be carried on a riderless lift truck, for example, and arranged to receive signals from the digital computer over either a wired or a wireless transmission system. The contents of register 20 are applied to a conventional digital-to-analog converter 22, which may comprise a resistor ladder network, for example, to provide an analogue output voltage $e$on on line 24 commensurate with the value of the digital speed command signal stored in register 20. Speed command signal $e_c$ is applied as one input signal to a summing device 26 shown as comprising a conventional direct-current differential amplifier. Amplifier 26 in FIG. 1 is assumed to be a noninverting type having a voltage gain of $A_{26}$.

Also shown applied to amplifier 26 is a velocity feedback signal $k_e e_n$ derived from conventional tachometer generator TG and scaled in magnitude by adjustment of potentiometer R-1. Tachometer generator TG is mechanically coupled to motor armature A and provides an output voltage $e_N$ commensurate with motor speed. Amplifier 26 provides an amplified output error signal $e$ commensurate in magnitude and polarity with the difference between its two input signals or otherwise expressed: $e = A_{26}(e_c - k_e e_N)$.

The error signal $e$ on line 28 is applied to control a modulator means 30 shown as comprising a pulse width modulator, which provides output pulses at a fixed frequency, with the positive durations of the pulses varying in width between a zero width value when error signal $e$ is zero, to either a maximum width or "continuously on" width when error signal $e$ equals or exceeds a selected positive value. If error signal $e$ is negative, pulse width modulator 30 lies disabled, or off, and provides no output pulses.

The controlled-width pulses from modulator 30 are applied to an armature driver switching circuit 32 to control the conduction time of one or more power transistors, a single transistor T-1 being shown in FIG. 4. During the positive durations of the successive pulses from modulator 30 transistor T-1 is switched on, so that current flows from the main power source (shown as comprising battery B1) through the armature A of motor M, through the collector-emitter circuit of transistor T-1, and back to battery B1 through the system ground return path. During the negative-durations of the output pulses from modulator 30, transistor T-1 is cutoff, interrupting the flow of current from power source B1 to armature A. As the signal $e$ increases positively, the pulses of increasing width applied to transistor T-1 will be seen to provide a greater time-average voltage to armature A, and hence a greater time-average current flow through armature A, and thus greater motor torque. The current flow through armature A will be recognized to vary directly in accordance with the time-average of the voltage applied by battery B1 and transistor T-1, less the counter-e.m.f. voltage across armature A, and to vary inversely with the armature circuit resistance $R_a$, which includes the "on" resistance of the transistors of circuit 22 and the internal resistance of battery B1. As described thus far, the application of pulses of controlled width or duty cycle to the armature of a shunt motor to control the average current through the armature is straight-forward and well-known. As is also well-known, a variety of other types of electronic switches, such as silicon controlled-rectifier switches, may be used in lieu of power transistors in circuit 32.

In accordance with the invention, the error signal $e$ from amplifier 26 is also applied as shown to a second non-inverting summing device, differential amplifier 34, which also receives an opposing velocity feedback signal $k_f e_N$ derived by tachometer generator TG and scaled by means of potentiometer R-2. Amplifier 34 may be assumed to have a gain of $A_{34}$. The output signal $e_2$, or $A_{34}(e - k_f e_N)$ from amplifier 34 is applied to an absolute value circuit means shown as comprising inverting amplifier 35 and diodes X-1 and X-2. During normal accelerating conditions command voltage $e_c$ will exceed velocity feedback voltage $k_f e_N$, and the output signal from amplifier 34 commensurate with the difference between the two signals will be positive. The positive output signal will be seen to be applied via diode X-1 to terminal 37. The output signal from inverting amplifier 35 will be seen to be negative, thereby reverse-biasing diode X-2. During deceleration on the other hand, the command input voltage $e_c$ to amplifier 34 will be less than the $k_f e_N$ input, so that the output signal from amplifier 34 becomes negative. The output signal from unity-gain inverting amplifier 35 then will be seen to be positive, so that diode X-2 will conduct and current flow through diode X-1 will be cut off. Thus the potential $e_{37}$ will be commensurate with the absolute value $A_{34}(e - k_f e_N)$ of the algebraic sum of the input signals applied to amplifier 34.

The potential on terminal 37 is applied to shunt field driver amplifier 38. The output signal $e_f$ from driver amplifier 38 is applied through switch S–R to control the field current through shunt field winding F of motor M. Inasmuch as the signal on terminal 37 is always positive, it will be seen that the same polarity field current is applied to field winding F during both acceleration and deceleration in a given direction of rotation. The direction of rotation of the motor may be reversed, of course, by operation of reversing switch S–R. With the time-average voltage applied to armature A by pulse width modulator 30 proportional to the error voltage $e$ on line 28, and with the field winding excitation controlled during acceleration to be equal to voltage $e$ minus $k_f e_N$, it will be seen that the circuit of FIG. 4 embodies the same basic arrangement as that explained above in connection with FIG. 1, thereby providing motor M with the same improved torque-speed characteristic during acceleration.

Assume initially that the input command signal in register 20 is zero and that motor M is at rest, so that both input signals to amplifier 26 are zero. It will be seen that the zero $e$ signal from amplifier 26 will result in no armature current being applied to armature A, and in no field current being applied to shunt field winding F. Next, assume that the digital signal in register 20 is changed at time $t_1$ to provide a step-function positive command signal $e_c$ to be applied from converter 22 to amplifier 26. The velocity feedback voltages $k_c e_N$ and $k_f e_N$ to amplifiers 26 and 34 will be zero, of course, with the motor at rest, so that the output signals $e$ and $e_2$ from amplifiers 26 and 34 will jump immediately to values commensurate with the input signal $e_c$. Armature current $I_a$ will be seen to rise rapidly, with a very slightly exponential characteristic due to armature inductance, as modulator 30 provides wide output pulses having a maximum duty cycle. The large output signal from amplifier 34 applied through diode X–1 will be seen to provide an output signal $e_3$, providing a similarly large field voltage $e_f$. Field current $I_f$ caused by the field voltage $e_f$ will increase with a slight exponential characteristic, due to the inductive time-constant of field winding F. With heavy armature and field currents applied to motor M, maximum motor torque will result, thereby providing maximum acceleration of motor M.

As the motor accelerates, the tachometer generator voltage $e_N$ will rise proportionally with motor speed, thereby applying increasingly negative feedback voltages via lag circuit 36 to amplifiers 26 and 34, and thereby decreasing the positive output voltages from both amplifiers. The error voltage $e$ thus will decrease as motor speed $N$ approaches the commanded speed. The output voltage of amplifier 34 will decrease at even a greater rate as the motor gains speed and larger $k_f e_N$ voltages are applied to amplifier 34. When the motor reaches the commanded speed, the voltage $e$ will have decreased to a small positive value which will provide just sufficient armature current and motor torque to maintain the commanded speed.

If the command voltage is then slowly reduced, without a change in load conditions, it will be seen that voltage $e$ will decrease, but still remain positive, resulting in a gradual decrease in armature current, motor torque and motor speed.

If, instead however, the command voltage $e_c$ is drastically reduced, it will be seen that the output signal $e$ from amplifier 26 will change in sign, to a negative voltage. As mentioned above, a negative $e$ voltage results in no output pulses being applied to switching circuit 22, and hence in no current being supplied to armature A from battery B1 during such deceleration conditions. The reversal in sign of the $e$ voltage will be seen to tend to result, however, in an increased input to field drive amplifier 38 and increased field current, since the negative $e$-signal now will add to rather than oppose the $k_f e_N$ feedback voltage applied to amplifier 24, providing an increased positive output from inverting amplifier 35 through diode X–2 to field driver amplifier 38. It will be seen that by provision of sufficient gain in inverting amplifier 35, the signal applied to field driver amplifier 38 easily may be made sufficient in magnitude to saturate field winding F whenever the $e$ signal is slightly negative, thereby providing a constant saturating-level field excitation throughout deceleration conditions.

The change in sign of error signal $e$ to a negative value is sensed and utilized to control deceleration control circuit 40. Deceleration control circuit 40, one simplified form of which is illustrated in FIG. 4, operates to connect the terminals of armature A to an energy buffer device 46, so that motor M acts as a generator during deceleration and stores energy in buffer 46, which may comprise, for example, a simple battery B2. In FIG. 4 deceleration control circuit 40 is shown as comprising a simple polarity-inverting amplifier 41 to which the speed error signal $e$ is connected through diode X–3. Whenever the speed error signal $e$ becomes sufficiently negative to overcome the forward resistance (e.g., 0.7 volt) of diode X–3, amplifier 41 provides sufficient positive output to saturate transistor switch T–2, thereby connecting the motor armature across energy buffer 46 to provide maximum deceleration. With a substantially constant (saturated level) field flux, the armature current applied to charge buffer 46 and the braking torque will be seen to decrease substantially linearly as speed decreases. The decelerating torque becomes small of course, as the motor speed approaches zero, and hence the arrangement of FIG. 4 is not effective in bringing the motor to a complete stop at a maximum rate when a speed of zero is commanded. In many applications, however, the deceleration system of FIG. 4 as described, together with the friction of the system, provides satisfactory control. The armature current and braking torque will be seen to become zero when the armature voltage is equal in magnitude and opposite in polarity to the buffer battery voltage, and hence use of a low-voltage battery B2 at 46 allows one to provide deceleration down to a lower speed. If battery B2 has a very low charge, or if a resistor is used in lieu of battery B2, deceleration to a complete stop may be accomplished.

Rather than the arrangement just described, wherein decelerate control 40 operates to fully close transistor T–2 whenever the speed error signal is negative, the gain of amplifier 41 may be selected, if desired, to operate transistor T–2 (and a plurality of further paralleled transistors, not shown, if desired) in a proportional manner, so that the circuit 44 resistance varies inversely with the magnitude of the speed error voltage. However, such an arrangement may dissipate appreciable power in the transistors of circuit 44 and require an undesirably large number of transistors in parallel in order to obtain the required amounts of decelerating torque. To avoid such a requirement, the decelerate control circuit 40 may include a further conventional pulse-width modulator (not shown) following amplifier 41, so that transistor T–2 is switched rapidly between fully open and fully closed conditions.

Figure 4A:
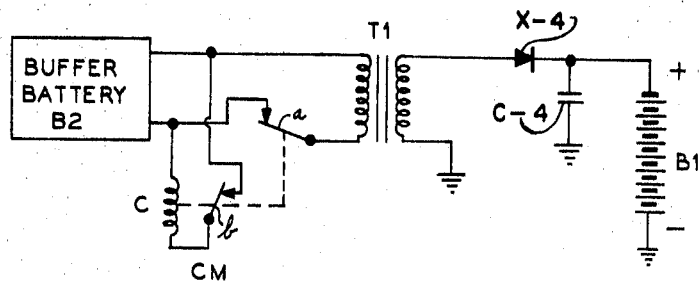
FIG. 4a is a schematic diagram of one specific form of energy-recovery system which may be used in connection with the system of FIG. 4.

The energy stored in buffer battery B2 during deceleration may be reclaimed in the manner shown in FIG. 4, by connection of battery B2 to a DC to AC converter and voltage amplifier means shown at 48, which converts the output voltage of battery B2 to an amplified alternating voltage, which is then rectified by rectifier means 50 and applied to recharge main battery B1. One simple form of inverter-rectifier system is shown in FIG. 4a as comprising a magnetic contact modulator or chopper CM having its operating coil C connected through NC contact $b$ across battery B2, and a further contact $a$ connected to periodically connect and disconnect battery B2 to the primary winding of transformer, T–1, thereby applying a square wave voltage to the transformer. The amplitude of the pulses applied to the transformer will vary, of course, with the state of the charge in battery B2. The steppedup output voltage induced in the transformer secondary winding is rectified by rectifier X–4, filtered by means shown as comprising capacitor C–4, and applied to charge battery B1. By using a stepup transformer as shown, buffer battery may be arranged always to contain a very low voltage, thereby allowing deceleration down to a very low speed, as mentioned above.

Figure 4B:
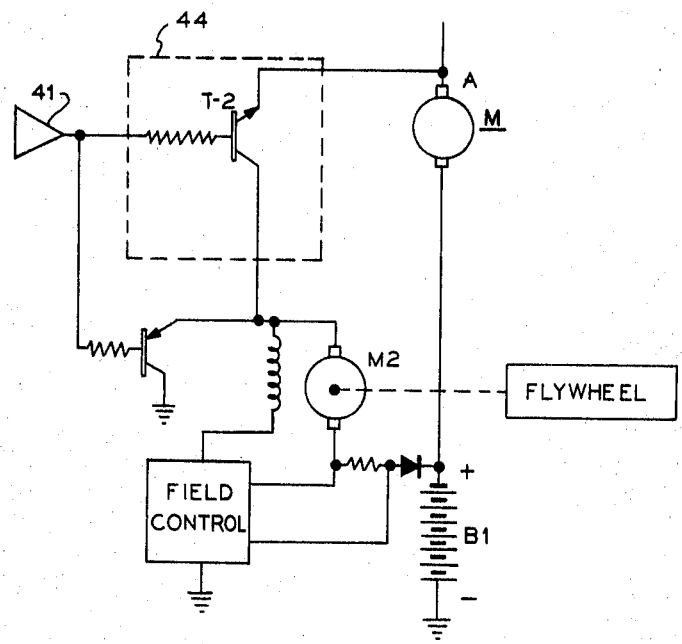
FIG. 4b illustrates an alternative form of energy-recovery arrangement which may be used in connection with the invention.

Other forms of energy buffer will occur at this point to those skilled in the art. Switching circuit 44 may be arranged, if desired, to apply the armature A voltage during deceleration to a further motor preferably provided with a flywheel, so that the further motor is accelerated during deceleration of Motor M, and during acceleration of motor M the further motor is connected as a generator to feed current to battery B1. Such an arrangement is shown in FIG. 4b where switching circuit 44 connects motor M to motor M-2 during deceleration to accelerate motor M-2. During acceleration of motor M, motor M-2 supplies current to battery B1, the field current of motor M-2 (then acting as a generator) being controlled in accordance with the current being supplied to battery B1, thereby maintaining the output voltage generated by M-2 high enough to charge B1 until the speed of motor (generator) M-2 decreases to a low value.

The invention likewise can be used in conjunction with direct current motors which employ a combination of permanent-magnet and electromagnet fields, with the electromagnetic field arranged such that it is capable of producing a field flux opposing the permanent magnet field. Tachometer feedback applied to the electromagnetic field in the manner previously described will produce the desired control of total field flux, and will produce the same improved speed-torque characteristics previously described.

While the invention has been illustrated in connection with a simple shunt motor having only a single field winding, it will be apparent at this point to those skilled in the art that the invention is applicable as well to a variety of shunt and compound motors having plural field windings, interpole windings and the like. Also, while the amplifiers mentioned above have been assumed to be transistor operational amplifiers having modest power ratings, it will be apparent that conventional magnetic amplifiers and rectifier systems, or amplidyne or "Rototrol" or the like amplifiers may be used in high power embodiments.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows.

I claim:

1. An electric motor speed control system having increased torque at its upper speed range, comprising, in combination:
    an electric motor having an armature circuit and a field winding circuit;
    first means for applying a variable-magnitude input voltage to said armature circuit to control the speed of said motor;
    second means for deriving a direct second voltage commensurate in magnitude with said input voltage;
    third means for deriving a direct feedback voltage proportional to the instantaneous speed of said motor; and
    summing circuit means responsive to said second voltage and said feedback voltage for providing a further voltage proportional to the difference between said second voltage and said feedback voltage to control said field winding circuit of said motor, said summing circuit means including a summing circuit and a direct-current time-lag circuit having a predetermined time-constant, said second voltage being connected directly to said summing circuit and said feedback voltage being connected to said summing circuit through said time-lag circuit means.

2. A system according to claim 1 wherein said time-constant of said time-lag circuit exceeds one-tenth second.

3. A system according to claim 1 having switching means responsive to said input voltage for bypassing said time-lag circuit means to connect said feedback voltage directly to said summing circuit.

4. An electric motor speed control system having increased torque at its upper speed range, comprising, in combination:
    an electric motor having an armature circuit and a field winding circuit;
    means for deriving a command voltage commensurate with a desired speed of said motor;
    amplifier means responsive to said command voltage and to a feedback voltage proportional to the speed of said motor for providing an input voltage to said armature circuit;
    second means for deriving a second voltage commensurate with said input voltage;
    third means for deriving said feedback voltage; and
    summing circuit means responsive to said second voltage and said feedback voltage for exciting said field winding circuit of said motor in proportion to the difference between said second voltage and said feedback voltage.

5. A system according to claim 4 having means for modulating a direct supply voltage with a duty cycle commensurate with the output voltage of said amplifier means to provide said input voltage to said armature circuit.

6. A system according to claim 4 having means responsive to the polarity of output signal of said amplifier means relative to a reference level for connecting a load device in parallel with said armature circuit when said output signal has one polarity and for not connecting said load device when said output signal has the opposite polarity.

7. A system according to claim 6 in which said load device comprises a first storage battery.

8. A system according to claim 7 in which said first means includes a second storage battery and in which said system includes means connecting said first storage battery to charge said second storage battery.

9. A system according to claim 6 in which said load device comprises a dynamo-electric machine.

10. A system according to claim 6 in which said load device comprises resistor means.

11. A system according to claim 4 in which said summing circuit means is operative to excite said field winding circuit with a current which varies in proportion to the absolute value of the difference between said second voltage and said feedback voltage.

12. A system according to claim 11 in which said summing circuit means comprises a first summing device connected to receive said second voltage and said feedback voltage, first and second unidirectional conducting means and polarity-inverting voltage, said first unidirectional conducting means and said polarity-inverting means being connected to receive the output signal of said first summing device, said second unidirectional conducting means being connected to receive the output signal of said polarity-inverting means, and means for applying the output signals from said first and second unidirectional conducting means to excite said field winding circuit.

13. An electric motor speed control system having increased torque at its upper speed range, comprising, in combination:
    an electric motor having an armature circuit and a field winding circuit;
    first means for applying a variable input voltage commensurate with a desired speed to said armature circuit;
    second means for deriving a second voltage proportional to said input voltage;
    means for sensing the current through said armature circuit to provide a fourth voltage;
    means responsive to said input voltage and said fourth voltage for deriving a feedback voltage commensurate with the instantaneous speed of said motor; and
    summing circuit means responsive to said second voltage and said feedback voltage for exciting said field winding circuit of said motor in proportion to the difference between said second voltage and said feedback voltage.

14. An electrical motor control system, comprising, in combination:
    an electric motor having an armature circuit and a field winding circuit;
    means for deriving a command voltage commensurate with a desired speed of said motor;
    means for deriving a feedback voltage commensurate with the instantaneous speed of said motor; amplifier means responsive to said command voltage and said feedback voltage for deriving a control voltage commensurate with the difference between said command voltage and said feedback voltage;

a first storage battery;

means responsive to said control voltage for applying voltage from said first storage battery to said armature circuit with a duty cycle commensurate with said control voltage when said control voltage has one polarity;

a second storage battery;

switching means responsive to the polarity of said control voltage for connecting said armature circuit to said second storage battery when said control voltage has a polarity opposite to said one polarity; and means connecting said second storage battery to charge said first storage battery.

15. A system according to claim 14 in which said means connecting said second storage battery to charge said first storage battery comprises means for modulating the voltage of said second storage battery to provide an alternating voltage, means for voltage-amplifying said alternating voltage, and means for rectifying the amplified alternating voltage.

16. A system according to claim 14 having means responsive to said control voltage and said feedback voltage for exciting said field winding circuit in accordance with the absolute magnitude of the difference between said control voltage and said feedback voltage.

17. A system according to claim 3 in which said switching means is polarity-sensitive and operative to bypass said time-lag circuit when said input voltage has a selected polarity.

18. A system according to claim 1 in which said summing circuit comprises direct-coupled amplifier means.

19. A closed-loop electric motor speed control system for continuously controlling the speed of a motor over a speed range between zero speed and a maximum speed, comprising, in combination:

an electric motor having an armature circuit and a field winding circuit;

means for deriving a variable command voltage having a magnitude commensurate with a desired speed of said motor;

first amplifier means connected to receive and algebraically sum said command voltage and a feedback voltage, said first amplifier means being operable to provide an input voltage commensurate with the algebraic sum of said command voltage and a feedback voltage, said first amplifier means being operable to provide an input voltage commensurate with the algebraic sum of said command voltage and said feedback voltage to said armature circuit when and only when said algebraic sum has a predetermined sign;

second means for deriving said feedback voltage, said feedback voltage varying in proportion to the speed of said motor over said speed range;

second amplifier means connected to receive and algebraically sum said feedback voltage and a voltage commensurate with said input voltage to provide an output voltage commensurate with the absolute magnitude of the algebraic sum of the voltages received by said second amplifier means, said output voltage being connected to excite said filed winding circuit of said motor.

20. A system according to claim 19 having switching means responsive to said input voltage for connecting a load device in parallel with said armature circuit when the algebraic sum of said command voltage and said feedback voltage has a sign opposite to said predetermined sign.